(12) United States Patent
Byrne et al.

(10) Patent No.: US 11,035,760 B2
(45) Date of Patent: Jun. 15, 2021

(54) CARTRIDGES FOR SAMPLE PARTITIONING

(71) Applicant: 3M INNOVATIVE PROPERTIES COMPANY, St. Paul, MN (US)

(72) Inventors: Ruby L. Byrne, Seattle, WA (US); Evan D. Brutinel, Inver Grove Heights, MN (US); Michael A. Haase, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 539 days.

(21) Appl. No.: 16/064,271

(22) PCT Filed: Dec. 21, 2016

(86) PCT No.: PCT/US2016/067940
§ 371 (c)(1),
(2) Date: Jun. 20, 2018

(87) PCT Pub. No.: WO2017/116891
PCT Pub. Date: Jul. 6, 2017

(65) Prior Publication Data
US 2019/0003930 A1    Jan. 3, 2019

Related U.S. Application Data

(60) Provisional application No. 62/271,659, filed on Dec. 28, 2015.

(51) Int. Cl.
*G01N 1/18* (2006.01)
*B01L 3/00* (2006.01)
(Continued)

(52) U.S. Cl.
CPC ............... *G01N 1/18* (2013.01); *B01L 3/505* (2013.01); *B01L 3/5085* (2013.01); *G01N 1/02* (2013.01);
(Continued)

(58) Field of Classification Search
CPC ........ G01N 1/18; G01N 1/02; G01N 35/1016; G01N 2035/1032; G01N 2035/1034;
(Continued)

(56) References Cited

U.S. PATENT DOCUMENTS

| 4,678,695 A | 7/1987 | Tung |
| 5,474,827 A | 12/1995 | Crandall |

(Continued)

FOREIGN PATENT DOCUMENTS

| CN | 202290081 U | 7/2012 |
| CN | 103037970 A | 4/2013 |

(Continued)

OTHER PUBLICATIONS

International Search Report for PCT International Application No. PCT/US2016/067940, dated Apr. 5, 2017, 4 pages.

*Primary Examiner* — Dennis White
(74) *Attorney, Agent, or Firm* — Yufeng Dong (57) ABSTRACT

Cartridges for sample partitioning and methods of making and using the cartridges are provided. The cartridges include a pouch to receive a mated stem-well film and a sealing film covered by a release liner. The stem film and the sealing film can be respectively separated from the well film and sealing film simultaneously by pulling a pull tab.

17 Claims, 9 Drawing Sheets

(51) Int. Cl.
*G01N 1/02* (2006.01)
*G01N 35/10* (2006.01)

(52) U.S. Cl.
CPC .. *G01N 35/1016* (2013.01); *B01L 2200/0642* (2013.01); *B01L 2200/0689* (2013.01); *B01L 2200/12* (2013.01); *B01L 2300/0819* (2013.01); *B01L 2300/0864* (2013.01); *B01L 2300/123* (2013.01); *G01N 2035/1032* (2013.01); *G01N 2035/1034* (2013.01)

(58) Field of Classification Search
CPC ................... B01L 3/5085; B01L 3/505; B01L 2300/0819; B01L 2200/0689; B01L 2200/12; B01L 2200/0642; B01L 2300/0864; B01L 2300/123
See application file for complete search history.

(56) References Cited

U.S. PATENT DOCUMENTS

| | | |
|---|---|---|
| 5,812,317 A | 9/1998 | Billingsley |
| 5,824,390 A | 10/1998 | Ochi |
| 6,172,810 B1 | 1/2001 | Fleming |
| 6,355,302 B1 | 3/2002 | Vandenberg |
| 7,723,452 B2 | 5/2010 | Hooftman |
| 2001/0038805 A1 | 11/2001 | Hamilton |
| 2006/0072858 A1 | 4/2006 | Kurosawa |
| 2007/0048063 A1 | 3/2007 | Bauer |
| 2013/0071303 A1 | 3/2013 | Macnamara et al. |
| 2014/0271408 A1 | 9/2014 | Taunk |
| 2015/0087078 A1 | 3/2015 | Richardson |

FOREIGN PATENT DOCUMENTS

| | | |
|---|---|---|
| EP | 2107010 | 10/2009 |
| WO | WO 2011/063332 A2 | 5/2011 |
| WO | WO 2013/170539 A1 | 11/2013 |
| WO | WO 2015/145154 A1 | 10/2015 |
| WO | WO 2017-112564 | 6/2017 |

CARTRIDGES FOR SAMPLE PARTITIONING

CROSS REFERENCE TO RELATED APPLICATIONS

This application is a national stage filing under 35 U.S.C. 371 of PCT/US2016/067940, filed Dec. 21, 2016, which claims the benefit of U.S. Application No. 62/271,659, filed Dec. 28, 2015, the disclosure of which is incorporated by reference in its/their entirety herein.

FIELD OF THE DISCLOSURE

This disclosure relates to cartridges for sample partitioning, and methods of making and using the cartridges.

BACKGROUND

A wide variety of methods and devices have been developed for segmenting an aqueous test sample into a large number of smaller discrete volumes. By using a sample partitioning device, a series of tiny compartments can be filled with the aqueous test sample where desired reaction or growth can occur and be detected much more rapidly than the same reaction or growth in a larger volume. A number of techniques have been disclosed such as, for example, the techniques described in U.S. Pat. No. 4,678,695 (Tung et al.), U.S. Pat. No. 5,824,390 (Ochi et al.), U.S. Pat. No. 5,474,827 (Crandall et al.), U.S. Pat. No. 5,812,317 (Billingsley et al.), U.S. Pat. No. 7,723,452 (Hooftman et al.), U.S. Pat. No. 6,172,810 (Fleming et al.), U.S. Pat. No. 6,355,302 (Vandenberg et al.), etc.

SUMMARY

There is a desire to provide simple and user-friendly cartridges for segmenting aqueous samples into small discrete volumes (e.g., wells having a volume in the order of nanoliters).

Briefly, in one aspect, a cartridge is provided that includes a pouch capable of containing liquid, the pouch having a first major side and a second major side opposite the first major side. A stem-well film is disposed on the first major side of the pouch, and the stem-well film includes a removable stem film and a well film that are mated with each other. A sealing film is disposed on the second major side of the pouch. The sealing film includes a removable release liner covering an adhesive surface thereof. A pull tab extends into the pouch, is attached to at least one of the removable stem film and the removable release liner, and is configured to remove the stem film and the release liner from the well film and the sealing film, respectively.

In another aspect, a method of making a cartridge is provided. The method includes providing a stem-well film comprising a well film and a removable stem film mated with the well film, providing a sealing film with a removable release liner covering an adhesive surface thereof, disposing the stem-well film on a first side of a pouch, disposing the sealing film on a second side of the pouch opposite the first side, and providing a pull tab attached to at least one of the removable stem film and the removable release liner.

In another aspect, a method of using the cartridges described herein is provide. The method includes filling the pouch with an aqueous test sample, pulling the pull tab away from the pouch to separate the stem film from the well film and the release liner from the sealing film, applying pressure to the pouch to seal the well film with the sealing film, and optionally punching the sealed well film out from the cartridge.

Various unexpected results and advantages are obtained in exemplary embodiments of the disclosure. One such advantage of exemplary embodiments of the present disclosure is that the cartridges are simple and user-friendly. The cartridges can provide an array of bubble-free sealed wells in a small coupon that is convenient for incubation and automated analysis. The coupon can be stamped out of the cartridge, and the remainder of the cartridge contains the excess aqueous sample for easy and safe disposal.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Cartridges for sample partitioning, and methods of making and using the cartridges are described herein. Some embodiments of the present disclosure describe cartridges including a pouch capable of containing liquid and an extendable sleeve attached to the pouch. The pouch receives a well film which is capable of segmenting liquid into wells thereof when a mated stem film is removed from the well film. The pouch also receives a sealing film that is capable of sealing the filled wells of the well film. The sealing film is covered by a release liner before use. A pull tab is attached to the stem film and the release liner and configured to separate the stem film from the well film and the release liner from the sealing film upon pulling. The exposed well film can be simultaneously filled with liquid. The filled well film can then be sealed by the sealing film by applying pressure to the pouch, for example, by miming a roller over the pouch. The sealed well film can be stamped out of the pouch as a coupon. The remainder of the cartridge containing the excess aqueous sample and the removed stem film and release liner can be disposable. Some embodiments described herein provide cartridges for partitioning aqueous sample into bubble-free sealed small volumes where wastes (e.g., excess aqueous sample, release liner, stem film, etc.) can be easily managed.

Figure 1:
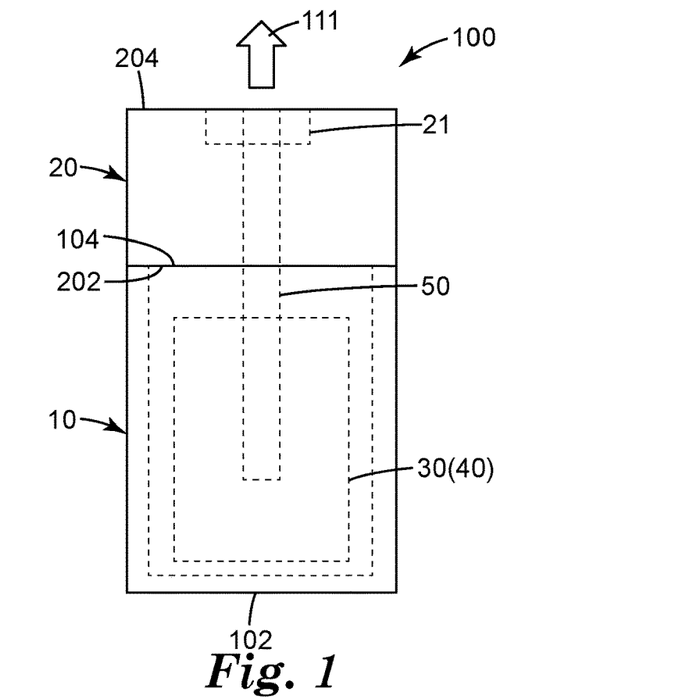
FIG. 1 is a front view of a cartridge including a pouch and a sleeve connected to the pouch, according to one embodiment.

FIG. 1 illustrates a side view of a cartridge 100, according to one embodiment. The cartridge 100 includes a pouch 10 capable of containing an aqueous sample. The pouch 10 has a closed end 102 and an open end 104 opposite the closed end 102. First and second films 30 and 40 are disposed inside the pouch 10 on the opposite major sides thereof. A pull tab 50 extends into the pouch 10 and is attached to at least one of the first and second films 30 and configured to remove at least a portion of the first and second films 30 and 40 out of the pouch. In some embodiments, the pouch 10 can be formed by aligning two separate pieces and bonding the respective edges. A cross sectional side view of an exemplary pouch 10 is shown in FIG. 2 which will be described further below.

The cartridge 100 further includes a sleeve 20 attached to the pouch 10. As shown in FIG. 1, the sleeve 20 has a first end 202 connected to the open end 104 of the pouch 10, and a second end 204 opposite the first end 202. In some embodiments, the sleeve 20 may have an extendable body that allows the second end 204 to move away from the first end 202 along a direction 111. The pull tab 50 has an end attached to the second end 204 of the sleeve 20, and another end extending through the sleeve 20 into the pouch 10 and attached to the films 30 and 40.

While in the depicted embodiment, the pouch 10 and the sleeve 20 respectively show rectangular shapes with four edges, it is to be understood that a pouch or a sleeve described herein can have various shapes and other numbers of edges as long as the pouch and the sleeve can be fluidly connected.

Figure 2:
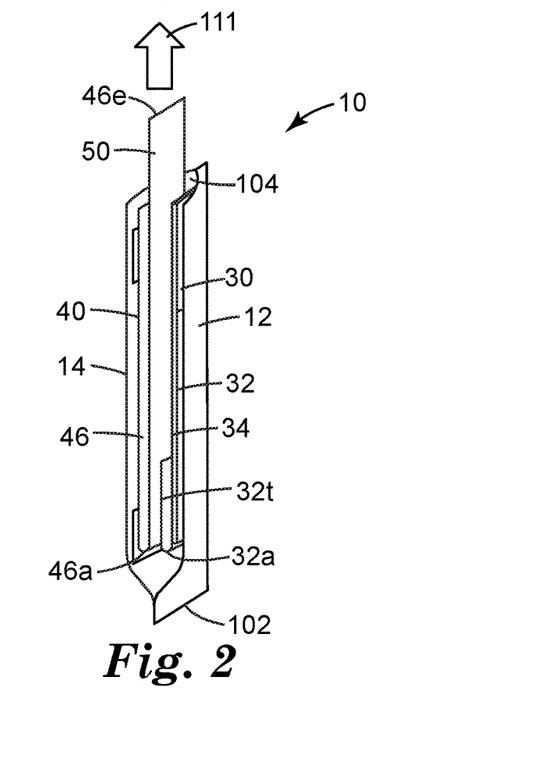
FIG. 2 is a cross-sectional side view of a pouch, according to one embodiment.

Referring to FIG. 2, the exemplary pouch 10 has a first major side 12 and a second major side 14 opposite the first major side 12. The first and second major sides 12 and 14 can be aligned and sealed on respective edges thereof to leave the end 104 open. In the depicted embodiment, the first film 30 is a mated stem-well film, and the second film 40 is a sealing film with a release liner covering an adhesive surface thereof. Inside the pouch 10, the stem-well film 30 is disposed on the first side 12, and the sealing film 40 disposed on the second side 14.

Figure 3A:
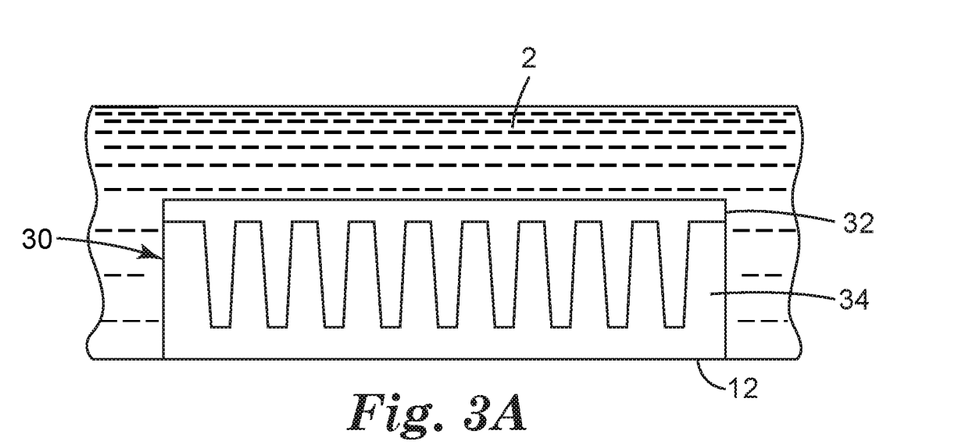
FIG. 3A is a mated stem-well film submerged in an aqueous test sample solution inside a pouch, according to one embodiment.
Figure 3B:
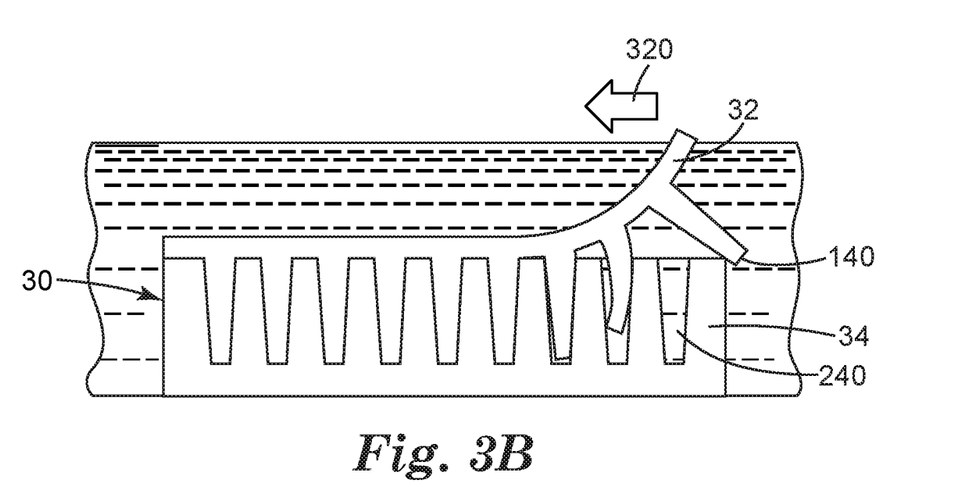
FIG. 3B illustrates the separation of the stem film from the well film to fill the wells with the aqueous test sample solution, according to the embodiment of FIG. 3A.

An enlarged portion of the stem-well film 30 is shown in FIGS. 3A-B. The stem-well film 30 includes a stem film 32 and a well film 34 that are separably mated with each other. The stem film 32 includes an array of posts 140 that project into the well film 34. When the stem-well film 30 is submerged under an amount of aqueous solution 2, and when the stem film 32 and the well film 34 are separated, an array of wells 240 can be formed instantaneously on the well film 34 which can be filled with the aqueous solution 2. The stem film 32 including the stems or posts 140 can be prepared, for example, by molding and curing a polymerizable resin such as, for example, polypropylene. The well film 34 can be formed, for example, by applying a film forming material such as, for example, UV-polymerizable acrylate on the stem film 32. Exemplary stem-well films and methods of making and using the same are described in a U.S. Provisional Patent Application No. 62/270,757 (Brutinel et. al., filed on Dec. 22, 2015), which is incorporated herein by reference. In the depicted embodiment, the well film 34 has its backing as the first side of the pouch 10, and the stem film 32 is removable from the well film 34 by, for example, peeling by applying a separation force at a peripheral edge of the stem film 32 as shown by an arrow 320 in FIG. 3B.

Referring again to FIG. 2, facing the mated stem-well film 30 is the sealing film 40 disposed on the second side 14 of the pouch 10. In some embodiments, the sealing film 40 may have a substrate that can serve as the second side 14 of the pouch 10. In some embodiments, the sealing film 40 may be provided with a backing which can serve as the second side 14. One or more adhesive materials can be provided on the major surface of sealing film 40 to form an adhesive surface. The adhesive surface can be covered and protected by a removable release liner 46 before use. Any suitable material can be used to provide the sealing film 40 with an adhesive surface. One example of the sealing film 40 is silicone polyurea (SPU) adhesives coated polypropylene.

The removable release liner 46 and the removable stem film 32 are arranged to be back-to-back. The pull tab 50 is attached to at least one of the release liner 46 and the stem film 32. Upon a pulling force on the pull tab 50 along the direction 111, the pull tab 50 can peel the stem film 32 and the release liner 46 away from the well film 34 and the sealing film 30, respectively, by applying a separation force at the respective peripheral edges adjacent the closed end 102 of the pouch 10.

In the embodiment of FIG. 2, the release liner 46 is folded along a folding line 46a such that a first portion of the release liner 46 covers the adhesive surface of the sealing film 40, and a second, folded portion of the release liner 46 extends towards and through the open end 104 of the pouch 10 to form the pull tab 50. The folding line 46a is located at a periphery end of the sealing film 40 adjacent to the closed end 102 of the pouch 10. The folded portion of the release liner 46 can extend from the folding line 46a into the sleeve 20 and has a distal end 46e to be attached to the sleeve 20 of FIG. 1.

The pull tab 50 is also attached to the stem film 32 and configured to remove the stem film 32 from the mated well film 34. In the embodiment of FIG. 2, the stem film 32 is folded along a folding line 32a to form a tab 32t. The tab 32t is attached to the pull tab 50. When the pull tab 50 is pulled along the direction 111, the release liner 46 and the stem film 32 can be removed from the sealing film and the well film 34, respectively, at the same time.

It is to be understood that in some embodiments, the release liner 46 and/or the stem film 32 may not be folded, and the pull tab 50 may be a separate piece that has one end attached to the sleeve 20 and another end attached to the release liner 46 and/or the stem film 32 such that when the sleeve 20 extends the pull tab 50 can move accordingly to peel the release liner 46 and the stem film 32 away from the sealing film 40 and the well film 34.

In the depicted embodiment of FIG. 1, the pull tab 50 has one end attached to the second end 204 of the extendable sleeve 20, and an opposite end attached to a removable stem film and a release liner. When a user pulls the second end 204 of the sleeve 20 away from the first end 202 of the sleeve 20, the pull tab 50 can move along with the second end 204 of the sleeve 20, which can remove the stem film 32 and the release liner from the well film 34 and the sealing film 40, respectively, for example, by peeling. It is to be understood that in some embodiments, the pull tab 50 can be attached to any movable portion of the sleeve 20 as long as the pull tab 50 can be pulled.

It is to be understood the pull tab 50 may have any suitable forms, and the removable release liner 46 and the removable stem film 32 can be attached to the pull tab 50 in any suitable manners as long as the movement of the pull tab along the direction 111 can remove the release liner 46 and the stem film 32 from the sealing film 40 and the well film 34, respectively.

It is to be understood that in some embodiments, the sleeve may be optional, and the pull tab 50 can have one end attached to at least one of the release liner 46 and the stem film 32 inside the pouch 10, and have the opposite end extending out of the pouch 10 and configured to be pullable.

Figure 4A:
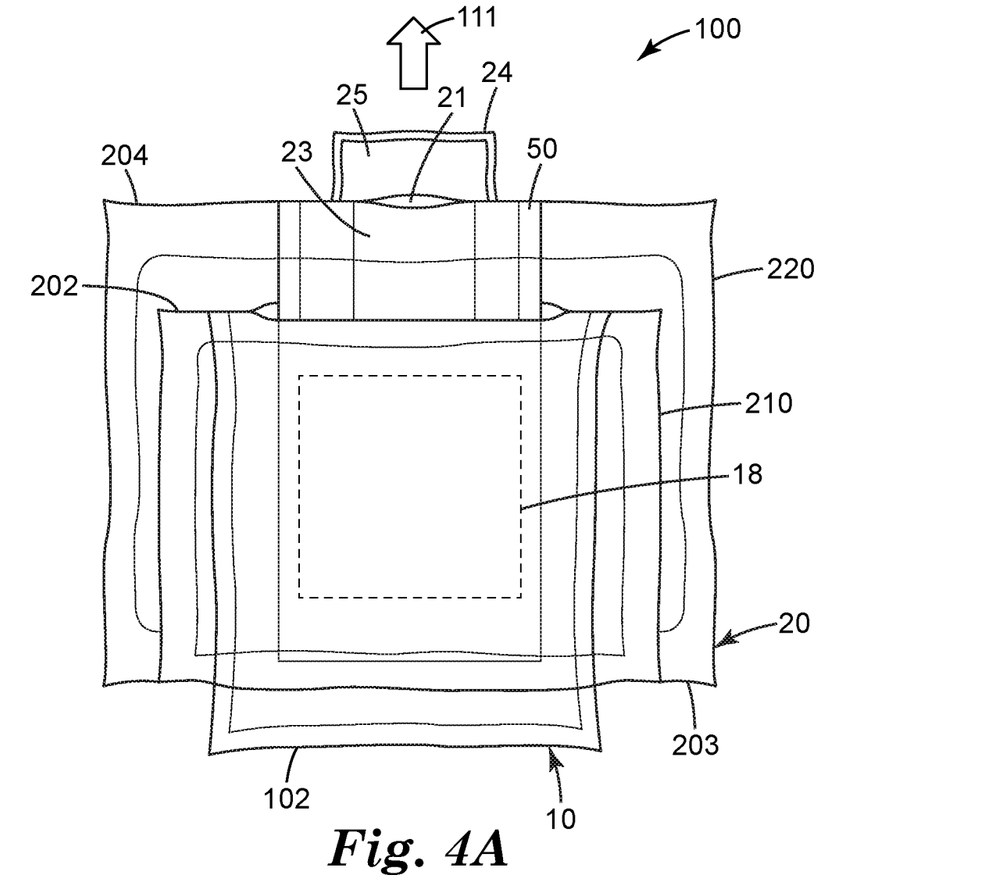
FIG. 4A is a side perspective view of a cartridge including a pouch and a sleeve, according to one embodiment.

As shown in FIG. 1, the cartridge 100 further includes a fill port 21 located adjacent the second end 204 of the sleeve 20. The fill port 21 is in fluid communication with the pouch 10 via the sleeve 20. An aqueous sample can be filled into the pouch 10 through the sleeve 20 via the fill port 21. In some embodiments, a pipette guide can be functionally connected to the fill port 21 and be used to guide a pipette into the sleeve 20 or even into the pouch 10. An exemplary pipette guide 23 is illustrated in FIG. 4A. The fill port 21 can be sealed, for example, by a sealing strip 24, before or after the filling of the pouch 10 with the aqueous sample. The sealing strip may have a removable release liner covered thereon. In some embodiments, the sealing strip may be formed as an extension of the pipette guide.

Figure 4B:
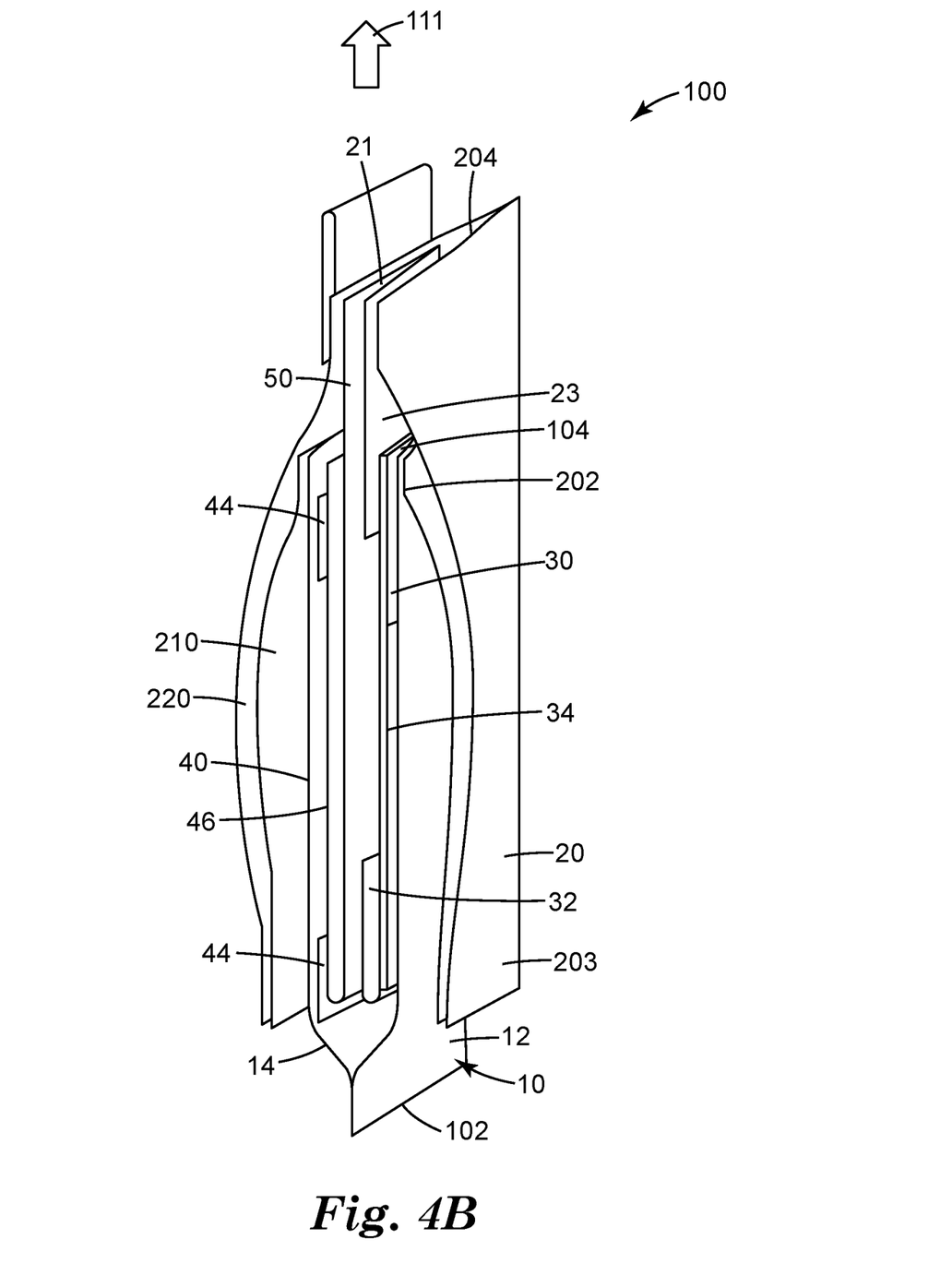
FIG. 4B is a cross sectional side view of the cartridge of FIG. 4A.
Figure 5:
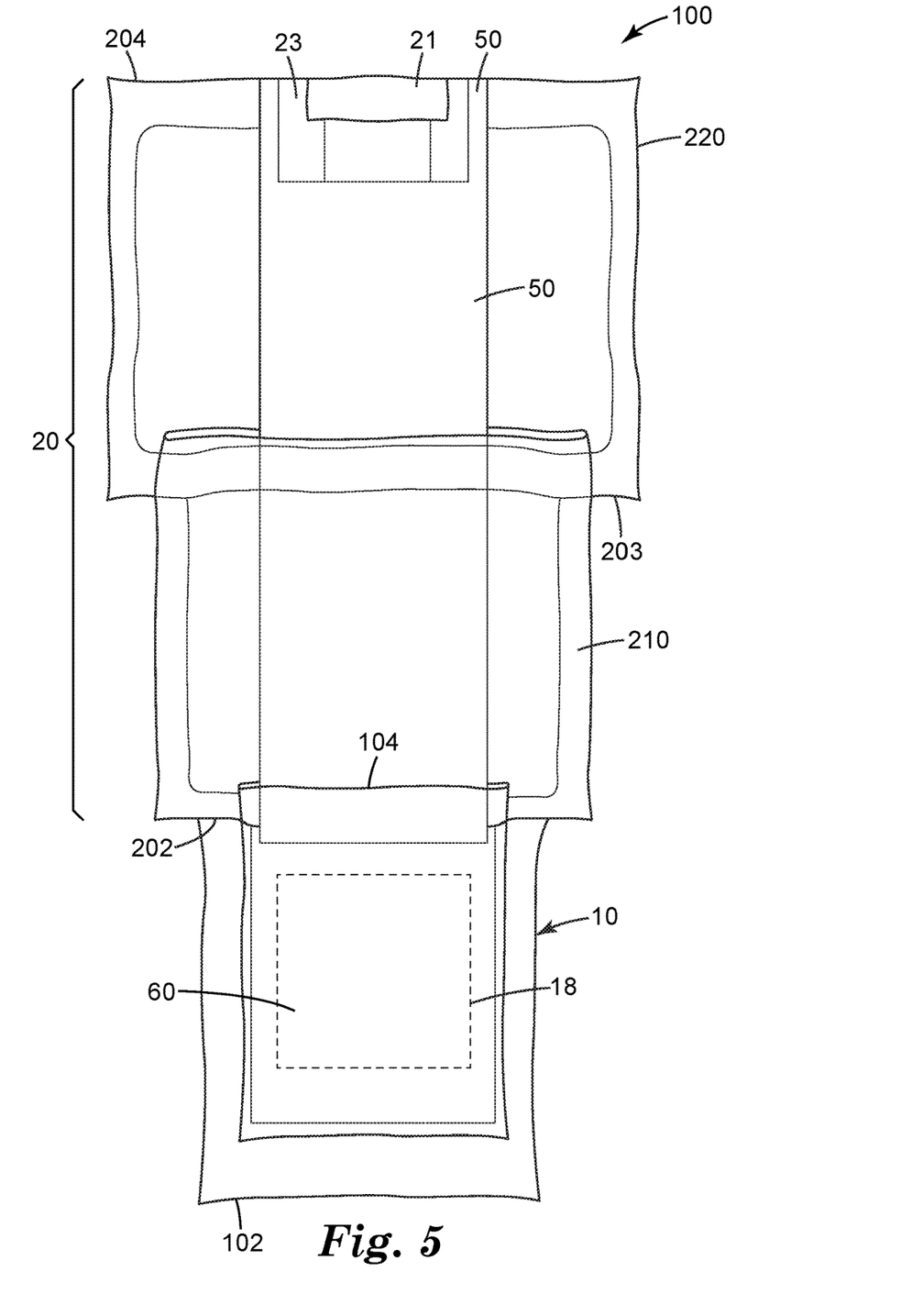
FIG. 5 is a side view of the cartridge of FIG. 4A after the sleeve is expanded.

FIGS. 4A and 4B show the exemplary cartridge 100 including the sleeve 20 and the pouch 10 fluidly connected with each other. In the depicted embodiment, the sleeve 20 includes an inner sleeve 210 and an outer sleeve 220 that are connected and sealed at a connecting line 203. The inner sleeve 210 extends between the first end 202 of the sleeve 20 and the connecting line 203. The outer sleeve 220 extends between the connecting line 203 and the second end 204 and receives the inner sleeve 210. The sleeve 20 can be expanded by unfolding the inner sleeve 210 and outer sleeve 220. An unfolded state of the sleeve 20 is shown in FIG. 5. It is to be understood that the sleeve 20 can have any suitable configurations that are expandable to allow the second end 204 or any other portion thereof moving away from the first end 202 so as to activate the pull tab 50 to remove the stem film 32 and the release liner 46 from the well film 34 and the sealing film 40, respectively.

In some embodiments, before use, the sleeve 20 of the cartridge 100 is in a folded state as shown in FIGS. 4A-B.

Figure 6:
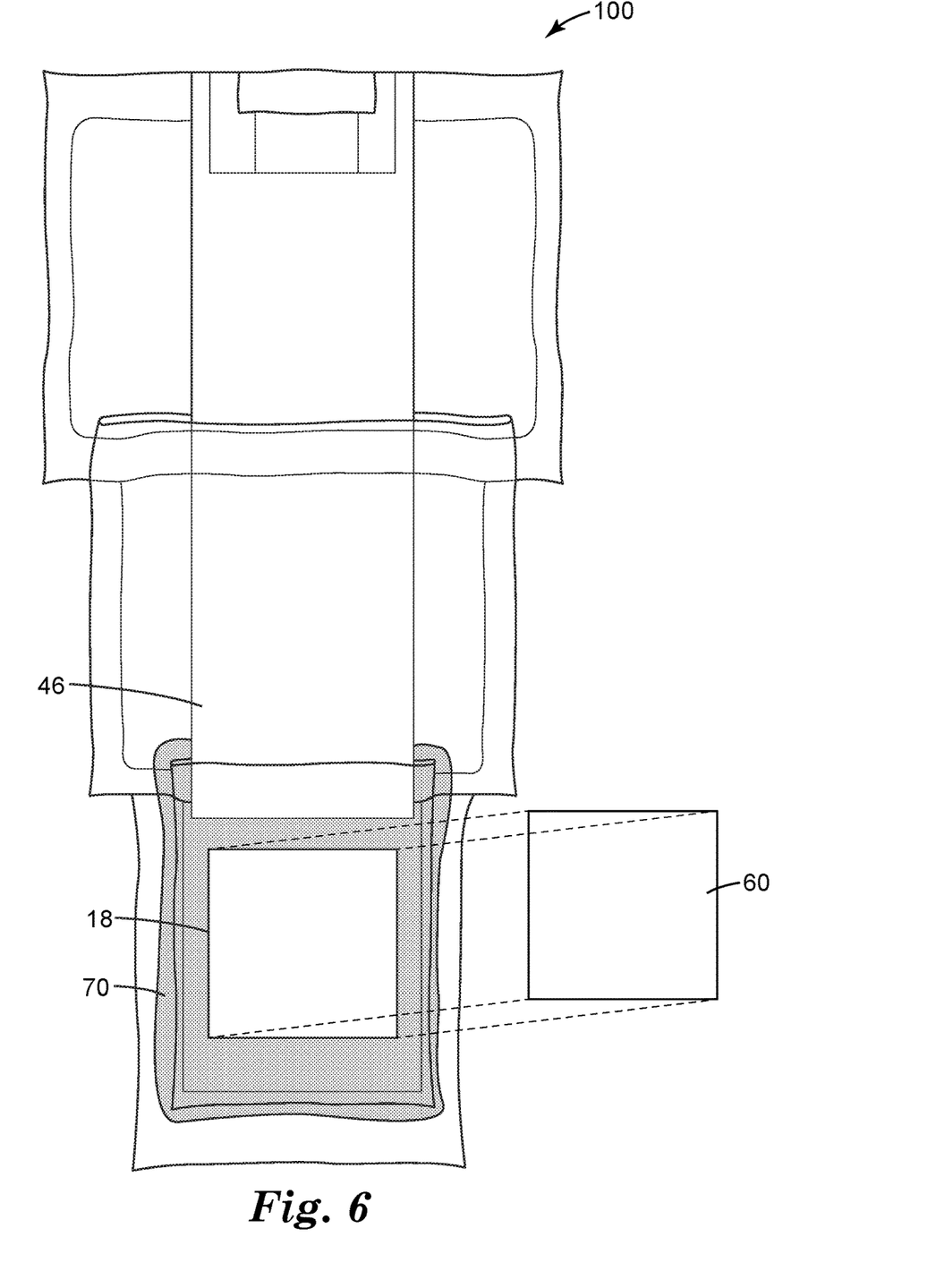
FIG. 6 illustrates a coupon being stamped out of the cartridge of FIG. 5.

A user can use a pipette to fill the pouch 10 through the fill port 21 with a suitable amount (e.g., about 0.1 to about 100 mL) of an aqueous sample. The fill port 21 is then sealed. The user can pull the pull tab 50 or the second end 204 of the sleeve 20 along the direction 111, removing the stem film 32 from the well film 34 to fill the wells of the well film 34 with the aqueous sample. This also exposes the sealing film 40 by removing the release liner 46 and expands the sleeve 20 to an unfolded state as shown in FIG. 5. Then, the user can seal the filled well film 34 with the exposed sealing film 40 by applying pressure to the pouch 10, such as, for example, with a roller to roll over the major side of the pouch 10. The region of the sealed well film 34 as denoted by a punch-out guide 18 can be punched out from the pouch 10 and detached as the coupon 60, as shown in FIGS. 5 and 6. To activate the pull tab 50 to remove the stem film 32 and the release liner 46 from the well film 34 and the sealing film 40, respectively, the sleeve 20 is extendable in a length, for example, no less than one time or two times of the length of coupon 60 in the movement direction.

It is to be understood that that the above description about the stem-well film and the sealing film can be applied to any other suitable films received in a pouch. The pull tab 50 of the pouch 10 can be used to remove any types of films that are disposed inside the pouch on the opposite major sides thereof. The films to be removed can respectively cover surfaces on the opposite major sides of the pouch that may need to be protected. After the films being removed, the protected surfaces can be exposed and mated by applying a pressure on the pouch in a similar manner as described for the sealing film and the well film.

The coupon 60 includes a well film (e.g., the well film 34) having an array of wells filled with aqueous sample and sealed by a sealing film (e.g., the sealing film 40). FIG. 6 illustrates the coupon 60 being punched out from the cartridge 100, which will be described further below. The punch-out guide 18 is optional and can be marked on the outside of the pouch 10 to indicate the boundaries of the coupon 60 to be punched out. The excess aqueous sample 70 and the removed release liner 46 and a stem film (e.g., element 32 of FIG. 2) can be fully contained within the remainder of the cartridge 100, which may be disposed of in an appropriate waste stream.

Figure 7A:
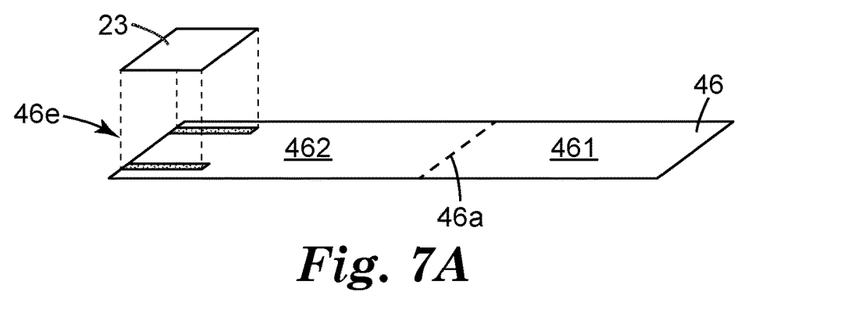
FIG. 7A illustrates a process of forming a release liner, according to one embodiment.
Figure 7B:
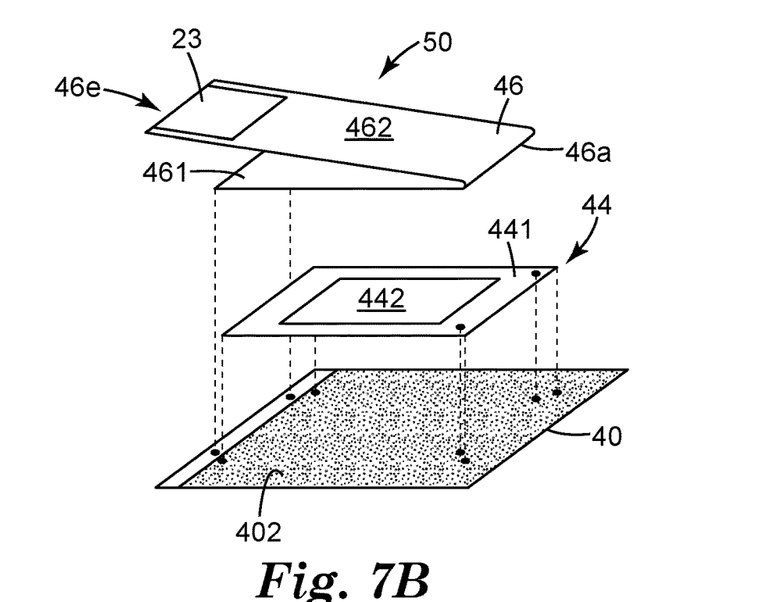
FIG. 7B illustrates a process of assembling a sealing film with the release liner of FIG. 7A on a side of a pouch, according to one embodiment.

FIGS. 7A-E and 8A-B illustrate processes of assembling the exemplary cartridge 100, according to some embodiments. As shown in FIG. 7A, the pipette guide 23 is attached to the release liner 46. In some embodiments, the pipette guide 23 can be omitted, and the user can manually guide a pipette into the extendable sleeve 20 or even into the pouch 10. The release liner 46 is folded along the folding line 46a to form a first portion 461 and a second, folded portion 462. The optional pipette guide 23 is disposed on the second portion 462 adjacent to the distal end 46e. As shown in FIG. 7B, the first portion 461 of the release liner 46 is provided to cover an adhesive surface 402 on the substrate of the sealing film 40. The sealing film 40 serves as a second side 14 of the pouch 10. The sealing film 40 may have an adhesive surface and the first portion 461 of the release liner 46 covers at least a portion of the adhesive surface to provide protection before use. The second, folded portion 462 of the release liner 46 extends to the second end 204 of the sleeve 20 to create the pull tab 50 (see FIG. 5) that, when pulled, can simultaneously separate the release liner from the sealing film and the stem film from the well film.

In the depicted embodiment, a mask 44 is disposed on the adhesive surface of the sealing film 40 to create a non-adhesive area. The mask 44 includes a thin frame 441 that forms the non-adhesive area surrounding a window area 442 which is to form a coupon such as the coupon 60 of FIG. 6. The thin frame 441 may have a width of, for example, about 0.1 mm to about 10 mm, and a thickness no greater than that of the well film. The size of the window 442 can be, for example, about 0.1 mm to about 1 m. The thin frame 441 can be made of a non-adhesive material such as, for example, polyethylene terephthalate (PET). It is to be understood that the non-adhesive area 441 and the enclosed window 442 can be formed by other suitable methods such as selective surface treatment of the adhesive surface to make it non-adhesive, instead of inserting the mask 44 between the sealing film 40 and the release liner 46. The functions of the non-adhesive area 441 will be described further below.

Figure 7C:
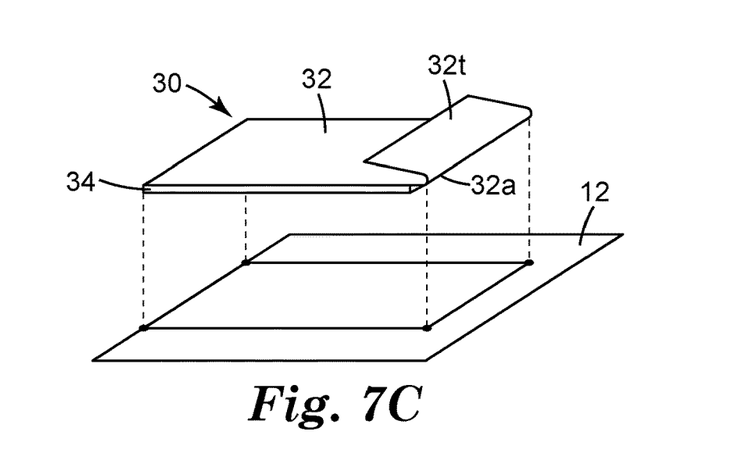
FIG. 7C illustrates a process of disposing a stem-well film on another side of a pouch, according to one embodiment.
Figure 7D:
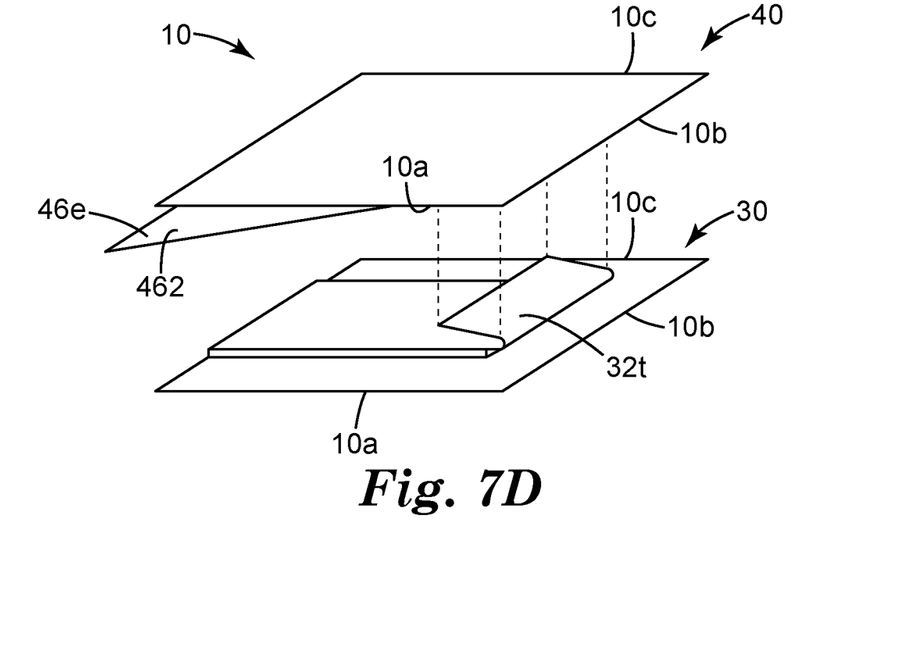
FIG. 7D illustrates a process of assembling the sealing film of FIG. 7B and the stem-well film of FIG. 7C to form a pouch.

As shown in FIG. 7C, the mated stem-well film 30 is attached to its backing which later can serve as the first side 12 of the pouch 10. The stem film 32 is folded along the folding line 32a to form the tab 32t. The sealing film 40 of FIG. 7B is then assembled with the stem-well film 30 of FIG. 7C by attaching the tab 32t to the folded portion 462 of the release liner 46, as shown in FIG. 7D. The respective edges 10a, 10b and 10c can be sealed to form the pouch 10 having the open end 104 and the close end 102 of FIG. 7E. During the assembling, sufficient clearance d can be left between the punch-out guide 18 and the non-adhesive area 441 to ensure that the cartridge 100 containing the excess aqueous sample remains sealed after the coupon 60 is removed. The arrangement of the punch-out guide 18 and the non-adhesive area 441 in the assembly is shown in FIG. 7E, according to one embodiment.

In some embodiments described herein, the non-adhesive area 441 made by the mask 44 can facilitate reducing or eliminating air bubbles in the filled wells of the well film 34. One of the challenges in operating a cartridge for partitioning aqueous samples into wells is to eliminate air bubbles in the wells. Air bubbles in sealed wells can lead to various problems such as, for example, irregularities in reading biological activity indicators. In some cases, even when the wells are initially fully filled, it is possible for air bubbles to form if the wells come in contact with air trapped inside the cartridge prior to sealing. For example, when a cartridge without the mask 44 is sealed by running a roller over a pouch from the bottom upwards, air trapped around the cartridge perimeter may be squeezed across the surface of the filled wells during sealing, producing air bubbles in the wells. This problem can be eliminated by instead sealing the cartridge from the center outwards. To facilitate this, it is helpful for the cartridge to include the non-adhesive area 441 on the adhesive surface to surround the stem well film 30. The non-adhesive area 441 can serve as a fluid flow channel allowing the liquid and trapped air to move out of the region. The non-adhesive area 441 also makes it easier when removing the stem film 32 and the release liner 46 from the well film 34 and the sealing film 40.

Figure 7E:
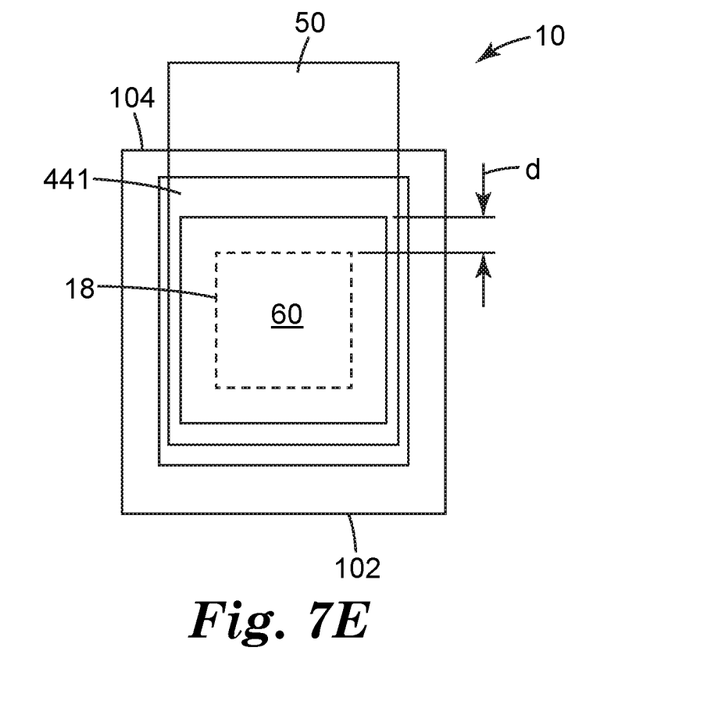
FIG. 7E illustrates positioning of a punch-out guide relative to a mask, according to one embodiment.
Figure 8A:
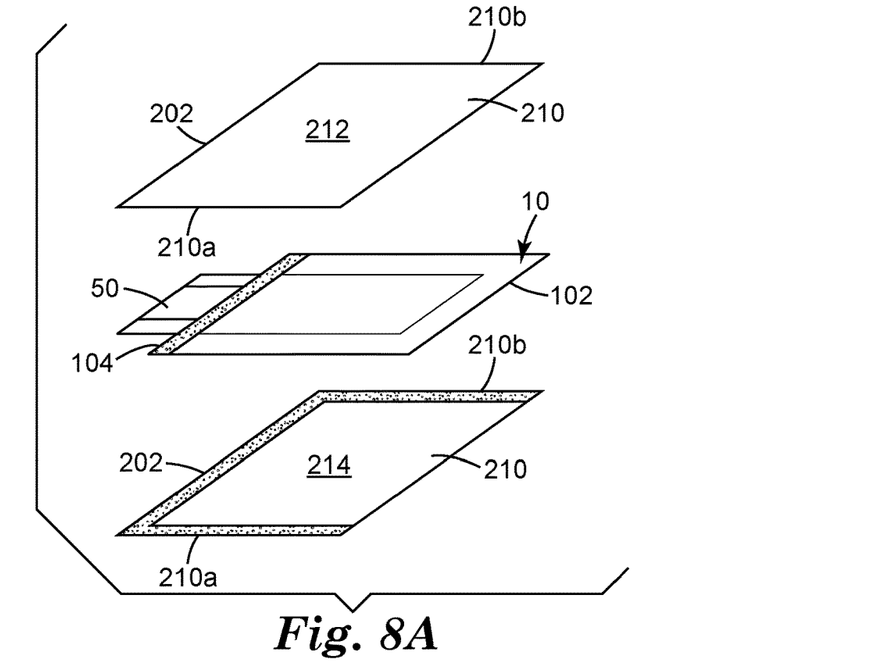
FIG. 8A illustrates a process of assembling the pouch of FIG. 7D with an inner sleeve, according to one embodiment.
Figure 8B:
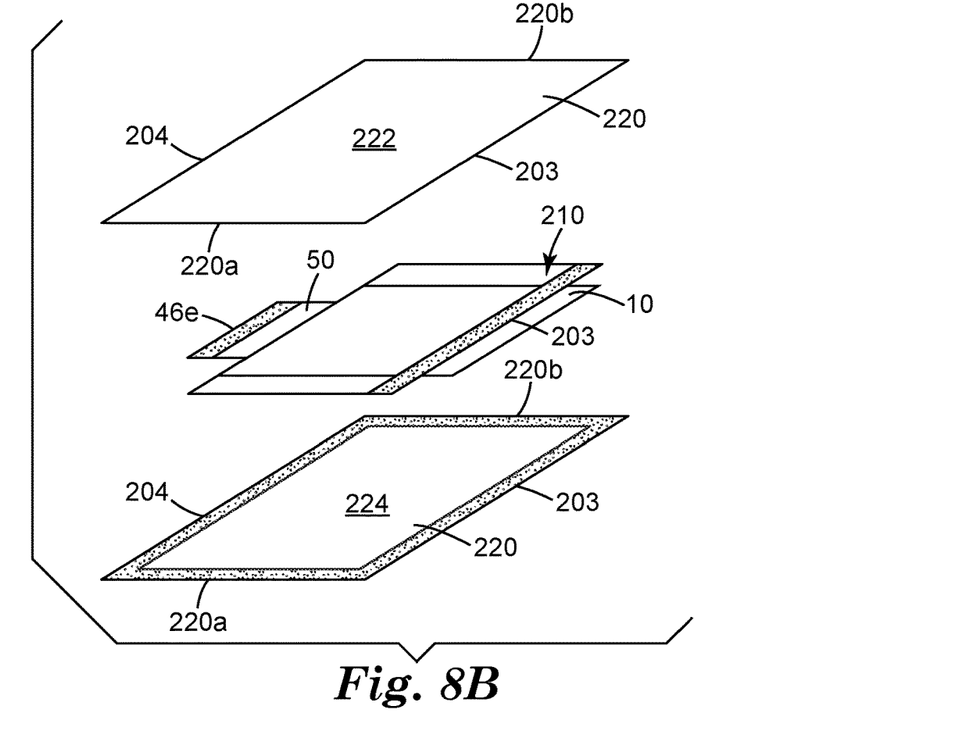
FIG. 8B illustrates a process of assembling the pouch and the inner sleeve of FIG. 8A with an outer sleeve, according to one embodiment.

As shown in FIGS. 8A-B, the pouch 10 of FIG. 7E is assembled with the inner sleeve 210 and the outer sleeve 220. In the depicted embodiment, the inner sleeve 210 and the outer sleeve 220 each include two separate pieces fluidly sealed along two edges. The inner sleeve 210 includes pieces 212 and 214 that are aligned and sealed along edges 210a and 210b. The sealed pieces 212 and 214 are attached to the pouch 10, for example, by bonding the first end 202 thereof to the open end 104 of the pouch 10 such that the inner sleeve 210 at least partially receives the pouch 10. The outer sleeve 220 includes pieces 222 and 224 that are aligned and sealed along edges 220a and 220b. The distal end 46e of the pull tab 50 is sandwiched and bonded by the pieces 222 and 224 at the second end 204 thereof. In some embodiments, the bond between the outer sleeve 420 and the pull tab 50 may include a gap to serve as a fill port. The sealed pieces 222 and 224 of the outer sleeve 220 are attached to the inner sleeve 210 by bonding at the connecting line 203.

The processes illustrates in FIGS. 7A-E and 8A-B are compatible with roll-to-roll (R2R) production techniques as the sleeve 20 and the pouch 10 are made of separate pieces which does not require complicated folding mechanisms.

The cartridges of the present disclosure can be incorporated into a wide variety of commercial articles to partition liquid such as microbiological samples. Various advantages are obtained in exemplary embodiments of the disclosure. One such advantage of exemplary embodiments of the present disclosure is that the cartridges are simple and user-friendly. The cartridges provide an array of bubble-free sealed wells in a small coupon that is convenient for incubation and automated analysis. The coupon can be stamped out of the cartridge, and the remainder of the cartridge contains the excess aqueous sample and the removed cover films for easy and safe disposal.

Various embodiments are provided that are cartridges for partitioning liquid, and methods of making and using the same.

LISTING OF EXEMPLARY EMBODIMENTS

It is to be understood that any of embodiments 1-13, 14-17, 18-22 and 23-26 can be combined.

Embodiment 1 is a cartridge comprising:
 a pouch capable of containing liquid, the pouch having a first major side and a second major side opposite the first major side;
 a stem-well film disposed on the first major side of the pouch, the stem-well film comprising a removable stem film and a well film that are mated with each other;
 a sealing film being disposed on the second major side of the pouch, the sealing film comprising a removable release liner covering an adhesive surface thereof; and
 a pull tab extending into the pouch and attached to at least one of the removable stem film and the removable release liner, and configured to remove the stem film and the release liner from the well film and the sealing film, respectively.

Embodiment 2 is the cartridge of embodiment 1, wherein the pull tab includes a first end adjacent to a closed end of the pouch and attached to at least one of the removable stem film and the removable release liner, and a second end opposite the first end and extending toward an open end of the pouch.

Embodiment 3 is the cartridge of embodiment 2, further comprising an extendable sleeve having a first end and a second end, the first end being connected to the open end of the pouch, and the second end is extendable away from the first end.

Embodiment 4 is the cartridge of embodiment 3, wherein the second end of the pull tab is attached to the second end of the extendable sleeve.

Embodiment 5 is the cartridge of embodiment 3 or 4, wherein the extendable sleeve includes an inner sleeve and an outer sleeve that are fluidly sealed at a connecting line along which the extendable sleeve is capable of being folded/unfolded.

Embodiment 6 is the cartridge of embodiment 5, wherein the inner sleeve and the outer sleeve each include two separate pieces fluidly sealed along two sides.

Embodiment 7 is the cartridge of any one of embodiment 3-6, wherein the extendable sleeve includes an elastic body that allows the first and second ends to move away from each other.

Embodiment 8 is the cartridge of any one of embodiment 3-7, wherein the second end of the extendable sleeve includes a fill port in fluid communication with the first end thereof and the open end of the pouch.

Embodiment 9 is the cartridge of embodiment 8, wherein the fill port further comprises a pipette guide.

Embodiment 10 is the cartridge of any one of embodiments 1-9, wherein at least one of the release liner and the stem film is folded along a folding line thereof to form the pull tab.

Embodiment 11 is the cartridge of any one of embodiments 1-10, wherein at least one of the release liner and the stem film is folded along a folding line thereof to form an attachment tab, the attachment tab of the stem film being attached to the pull tab.

Embodiment 12 is the cartridge of any one of embodiments 1-11, wherein the sealing film comprises a non-adhesive area surrounding a window area on the adhesive surface.

Embodiment 13 is the cartridge of any one of embodiments 1-12, further comprising a punch-out guide disposed on the first or second major side of the pouch.

Embodiment 14 is a method of making the cartridge of any one of the preceding embodiments, comprising:
  providing a stem-well film comprising a well film and a removable stem film that are mated with each other;
  providing a sealing film with a removable release liner covering an adhesive surface thereof;
  disposing the stem-well film on a first side of a pouch;
  disposed the sealing film on a second side of the pouch opposite the first side; and
  providing a pull tab extending into the pouch and attached to at least one of the removable stem film and the removable release liner.

Embodiment 15 is the method of embodiment 14, further comprising attaching an extendable sleeve to the pouch, wherein the extendable sleeve includes a first end and a second end, the first end being connected to an open end of the pouch, and the second end including a fill port in fluid communication with the first end thereof and the open end of the pouch.

Embodiment 16 is the method of embodiment 15, wherein the extendable sleeve includes an inner sleeve and an outer sleeve that are fluidly sealed at a connecting line along which the extendable sleeve is capable of being folded/unfolded.

Embodiment 17 is the method of embodiment 15 or 16, wherein the pull tab extends towards the second end of the sleeve and has a distal end attached to the second end of the sleeve.

Embodiment 18 is a method of using the cartridge of any one of the preceding embodiments, comprising filling the pouch with an aqueous test sample.

Embodiment 19 is the method of embodiment 18, further comprising pulling the pull tab away from the pouch to remove the stem film and the release liner from the well film and the sealing film.

Embodiment 20 is the method of embodiment 19, wherein a plurality of wells of the well film is filled with the aqueous test sample when the stem film is removed from the well film.

Embodiment 21 is the method of embodiment 20, further comprising applying pressure to the pouch to seal the well film with the sealing film.

Embodiment 22 is the method of embodiment 21, further comprising punching the sealed well film out from the cartridge as a coupon.

Embodiment 23 is a cartridge comprising:
  a pouch capable of containing liquid, the pouch having a first major side and a second major side opposite the first major side;
  a first film removably disposed on the first major side of the pouch;
  a second film removably disposed on the second major side of the pouch; and
  a pull tab extending into the pouch and attached to at least one of the first and second films, and configured to remove the first and second films from the first and second major sides of the pouch, respectively.

Embodiment 24 is the cartridge of embodiment 23, wherein the pull tab includes a first end adjacent to a closed end of the pouch and attached to at least one of the removable stem film and the removable release liner, and a second end opposite the first end and extending toward an open end of the pouch.

Embodiment 25 is the cartridge of embodiment 24, further comprising an extendable sleeve having a first end and a second end, the first end being connected to the open end of the pouch, and the second end is extendable away from the first end.

Embodiment 26 is the cartridge of embodiment 25, wherein the second end of the pull tab is attached to the second end of the extendable sleeve.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments.

Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A cartridge comprising:
    a pouch capable of containing liquid, the pouch having a first major side and a second major side opposite the first major side;
    a stem-well film disposed on the first major side of the pouch, the stem-well film comprising a removable stem film and a well film that are mated with each other;
    a sealing film being disposed on the second major side of the pouch, the sealing film comprising a removable release liner covering an adhesive surface thereof; and
    a pull tab extending into the pouch and attached to at least one of the removable stem film and the removable release liner, and configured to remove the stem film and the release liner from the well film and the sealing film, respectively.

2. The cartridge of claim 1, wherein the pull tab includes a first end adjacent to a closed end of the pouch and attached to at least one of the removable stem film and the removable release liner, and a second end opposite the first end and extending toward an open end of the pouch.

3. The cartridge of claim 2, further comprising an extendable sleeve having a first end and a second end, the first end being connected to the open end of the pouch, and the second end is extendable away from the first end.

4. The cartridge of claim 3, wherein the second end of the pull tab is attached to the second end of the extendable sleeve.

5. The cartridge of claim 3, wherein the extendable sleeve includes an inner sleeve and an outer sleeve that are fluidly sealed at a connecting line along which the extendable sleeve is capable of being folded/unfolded.

6. The cartridge of claim 5, wherein the inner sleeve and the outer sleeve each include two separate pieces fluidly sealed along two sides.

7. The cartridge of claim 3, wherein the extendable sleeve includes an elastic body that allows the first and second ends to move away from each other.

8. The cartridge of claim 3, wherein the second end of the extendable sleeve includes a fill port in fluid communication with the first end thereof and the open end of the pouch.

9. The cartridge of claim 8, wherein the fill port further comprises a pipette guide.

10. The cartridge of claim 1, wherein at least one of the release liner and the stem film is folded along a folding line thereof to form the pull tab.

11. The cartridge of claim 1, wherein at least one of the release liner and the stem film is folded along a folding line thereof to form an attachment tab, the attachment tab of the stem film being attached to the pull tab.

12. The cartridge of claim 1, wherein the sealing film comprises a non-adhesive area surrounding a window area on the adhesive surface.

13. The cartridge of claim 1, further comprising a punch-out guide disposed on the first or second major side of the pouch.

14. A method of making a cartridge, comprising:
    providing a stem-well film comprising a well film and a removable stem film that are mated with each other;
    providing a sealing film with a removable release liner covering an adhesive surface thereof;
    disposing the stem-well film on a first side of a pouch;
    disposed the sealing film on a second side of the pouch opposite the first side; and
    providing a pull tab extending into the pouch and attached to at least one of the removable stem film and the removable release liner.

15. The method of claim 14, further comprising attaching an extendable sleeve to the pouch, wherein the extendable sleeve includes a first end and a second end, the first end being connected to an open end of the pouch, and the second end including a fill port in fluid communication with the first end thereof and the open end of the pouch.

16. The method of claim 15, wherein the extendable sleeve includes an inner sleeve and an outer sleeve that are fluidly sealed at a connecting line along which the extendable sleeve is capable of being folded/unfolded.

17. The method of claim 15, wherein the pull tab extends towards the second end of the sleeve and has a distal end attached to the second end of the extendable sleeve.

* * * * *

UNITED STATES PATENT AND TRADEMARK OFFICE
CERTIFICATE OF CORRECTION

| | | |
|---|---|---|
| PATENT NO. | : 11,035,760 B2 | |
| APPLICATION NO. | : 16/064271 | |
| DATED | : June 15, 2021 | |
| INVENTOR(S) | : Byrne et al. | |

It is certified that error appears in the above-identified patent and that said Letters Patent is hereby corrected as shown below:

In the Specification

Column 3
Line 23, Delete "miming" and insert -- running --, therefor.

Column 4
Line 22, Delete "2015)," and insert -- 2015, Attorney Case No. 77412US002), --, therefor.

Signed and Sealed this
Seventh Day of June, 2022

Katherine Kelly Vidal
*Director of the United States Patent and Trademark Office*